May 22, 1951 H. E. YOUNG ET AL 2,553,621
BUTTER CUTTER
Filed Oct. 3, 1949 2 Sheets-Sheet 1
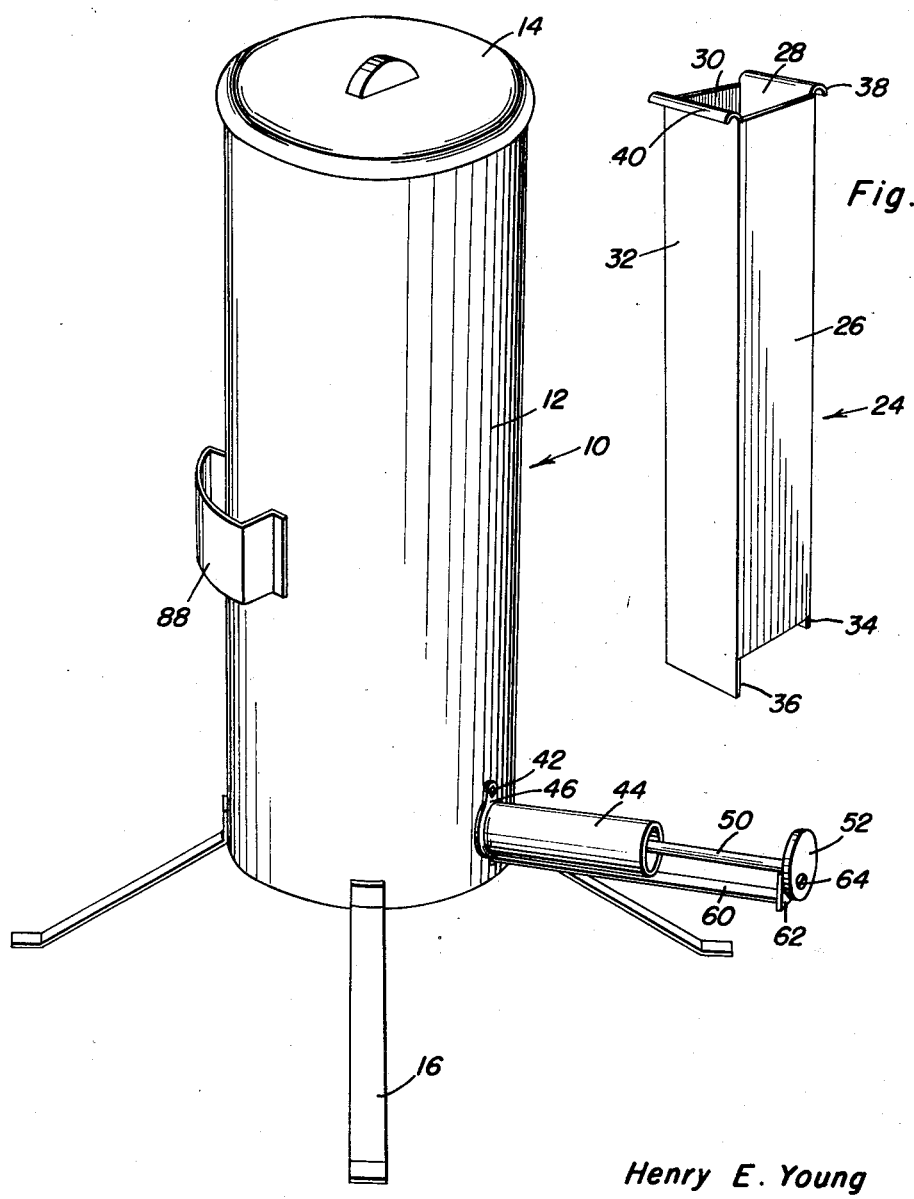
Inventor
Henry E. Young
George V. Farnham
By *Clarence A. O'Brien
and Harvey B. Jacobson*
Attorneys May 22, 1951 H. E. YOUNG ET AL 2,553,621
BUTTER CUTTER
Filed Oct. 3, 1949 2 Sheets-Sheet 2
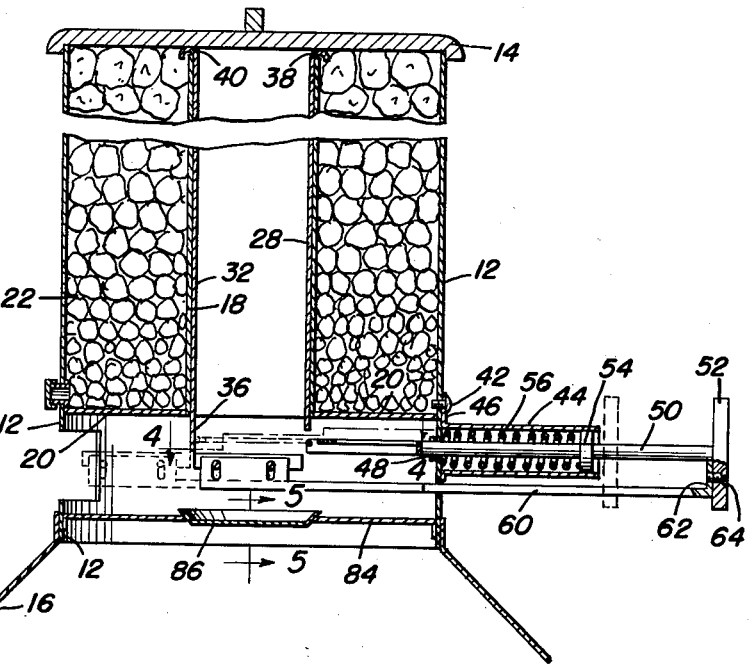
Fig. 3.
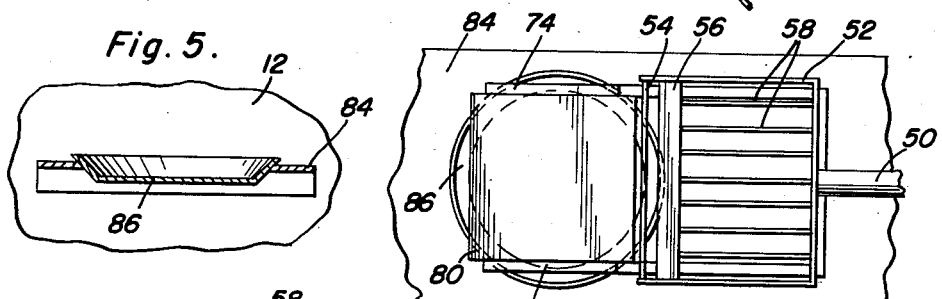
Fig. 5.
Fig. 4.
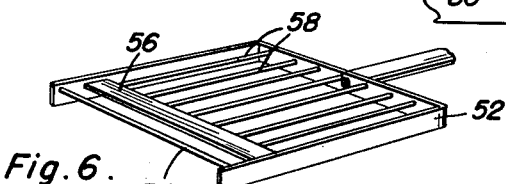
Fig. 6.
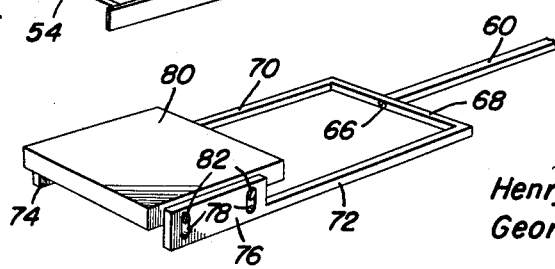
Fig. 7.
Inventor
Henry E. Young
George V. Farnham
By Clarence A. O'Brien
and Harvey B. Jacobson
Attorneys Patented May 22, 1951

2,553,621

UNITED STATES PATENT OFFICE 2,553,621

BUTTER CUTTER

Henry E. Young and George V. Farnham, Knoxville, Tenn., assignors of two per cent to Neal B. Spahr, four per cent to Boyd W. Cox, four per cent to Robert E. Anderson, all of Knoxville, Tenn., and five per cent to Bernard R. Waller and Helen F. Hayes Application October 3, 1949, Serial No. 119,296

1 Claim. (Cl. 31—21)

This invention relates to the class of cooking utensils, and more particularly to an apparatus for cutting butter into small parts and depositing on butter dishes for serving on a table.

An object of the present invention is to provide a butter cutter into which an oblong rectangular section of butter may be placed, and by simple manipulation the butter cutter will slice off and deliver a pat of butter onto a butter tray.

In restaurants, hotels, and other commercial eating establishments the large quantities of butter and similar substances dispensed usually are handled several times so as to be both expensive and unsanitary. It is therefore a further object of the invention to provide a device which will deliver butter in a desired shape, without necessitating unsanitary handling thereof.

A further object of the invention is to provide a device which will keep the butter chilled so that it will slice easily in order to deliver pats with sharp outlines.

Yet another object of the invention is to provide a butter cutter which may be easily disassembled for washing and cleaning so as to preserve the device in a sanitary condition.

Still further objects reside in the provision of a butter cutter that is strong, durable, convenient in operation, simple in construction and manufacture, pleasing in appearance, and quite inexpensive.

These, together with the various ancillary objects of the invention which will become apparent as the following description proceeds, are attained by this butter cutter, a preferred embodiment of which has been illustrated, by way of example only, in the accompanying drawings, wherein:

Figure 1 is a perspective view of the device comprising the present invention;

Figure 2 is a perspective view of the butter chute comprising one element of the invention;

Figure 3 is a vertical sectional view of the butter cutter, shown in enlarged scale for greater detail thereof;

Figure 4 is a horizontal sectional view of the device as taken along line 4—4 of Figure 3;

Figure 5 is a vertical sectional view as taken on line 5—5 of Figure 3;

Figure 6 is a perspective view of a detail of the invention; and,

Figure 7 is a perspective view of the mechanism for determining the thickness of the pat of butter to be delivered.

With continuing reference to the accompanying drawings wherein like reference numerals designate similar parts throughout the various views, reference numeral 10 is used to generally designate the butter cutter comprising the present invention. The butter cutter comprises a container 12 having a removable lid 14. The container 12 is supported by suitable legs 16 or may optionally be supported by a base of suitable configuration. Each container 12 may be formed from a hollow cylinder of round or square configuration and an inner tube 18 preferably of rectangular or square cross section is secured coaxial with the container 12 by means of a suitable base 20. As can be readily seen container 12 together with the inner tube 18 and the base 20 forms a receptacle for cracked ice 22 or the like which may be used to chill the butter placed in the apparatus.

A chute generally designated by reference numeral 24, and as best shown in Figure 2, is secured within the tube 18. The chute 24 is a tube of square or rectangular cross section and is provided with sides 26, 28, 30, and 32. The side 28 extends downwardly by means of flange 34 further than the sides 26 or 30, and the side 32 extends downwardly further than the side 28 by means of extending flange 36.

These sides 28 and 32 are further provided with overhanging curved flanges 38 and 40 which are adapted to fit over the tube 18 to hold the chute in a predetermined relationship therewith.

Secured to the portion of the container 12 which extends below the base 20 by means of screw 42 is a cylinder 44 having the flange 46 conforming to the exterior configuration of the container 12. Slidably positioned in the cylinder 44 and descending through an aperture 48 in the container 12 is a rod 50 having a push button knob 52 secured at one end. Piston-like annular ring 54 is secured to the rod medially thereof. A coil spring 56 coaxial with the rod 50 is positioned in the cylinder 44 so as to continuously bias the container 12 and the ring 54 thus urging the rod 50 outwardly of the container 12. Secured to the other end of the rod 50 is a cutting member 52 which has secured between the U-shaped frame thereof a piano wire cutting edge 54 supplemented by a cross bar 56 and other longitudinal line wires 58. It is easily seen that when the push button 52 is pressed inwardly the cutting wire 54 will slice a pat of butter of a predetermined thickness from the oblong stick of butter and move forward until the piano wire 54 abuts against the flange 36 of the chute 24. When the knob 52 is released, the spring 56 will urge the rod 50 outwardly until the natural connecting portion of the frame of the cutting member 52 abuts against the inner surface of the container 12.

A shaft 60 has a vertically ascending piece 62 at one end thereof which may be secured by set screw 64 to the push button 52. The shaft 60 is slidably mounted through the container 12 and is secured by means of set screw 66 the central connecting portion 68 of a substantially U-shaped member having a pair of parallel extending legs 70 and 72. Each of the legs 70 and 72 are provided at their innermost ends with thickened portions 74 and 76 respectively which have slots 78 therethrough. A valve member 80 of substantially square or rectangular shape similar to that of the chute 24 is adjustably secured within the slots 78 by means of screws 82. The screws 82 may be released and the valve 80 may be raised or lowered as desired to predetermine the thickness of the pat of butter to be cut from the stick of butter emplaced in the chute 24.

Secured to the bottom of the container 12 and more particularly to the inner surface thereof by welding or other conventional means is a strip 84 having an aperture therein adapted to selectively support a butter tray 86 which may be placed therein by sliding over the strip and hence deposited in the aperture.

It can be readily seen that when the push button 52 is depressed the shaft 60 will move inwardly causing the valve member 80 to assume the position shown in dotted lines in Figure 3. This will allow the butter pats cut by the piano wire member 54 to fall off on the tray 86. The stick of butter is placed within the chute in the unactuated position and rests upon the valve member 80. When the push button 52 is depressed the piano wire 54 cuts the slice of butter. At the same time the rest of the wires 58 support the stick of butter over the cut while the valve member 80 is removed from beneath the butter pat. It can be readily seen that by adjusting the height of the valve member 80 the distance between the cutting edge 54 of the cutting member 52 and the top surface of the valve member 80 will determine the thickness of the pat of butter to be cut from the butter stick.

A holder 88 for butter trays of suitable configuration is placed on the side of the container opposite the rod 50. It can be readily understood that suitable refrigerating coils may be substituted for the crushed ice when electric cooling is desired.

Since from the foregoing, the construction and advantages of this butter cutter are readily apparent, further description is believed to be unnecessary. However, since numerous modifications will readily occur to those skilled in the art after a consideration of the foregoing specification and the accompanying drawings, it is not intended to limit the invention to the precise embodiment shown and described, but all suitable modifications and equivalents may be resorted to which fall within the scope of the appended claim.

Having described the invention, what is claimed as new is:

A butter cutter comprising a container, an inner chute secured within said container, said chute comprising a tube of substantially rectangular cross section formed by two opposing pairs of substantially parallel sides, one of said pairs of sides terminating outwardly of the other of said pairs of sides, one of the sides of said one pair of sides terminating outwardly of the other side of said pair of sides, said chute being adapted to receive a stick of butter, a rod slidably mounted in said container, a butter blade on said rod adapted to selectively cut a slice of butter of predetermined thickness, said one side of said chute limiting the sliding movement of said rod in one direction, means continuously urging said rod in the opposite direction, a shaft secured to said rod and slidably mounted therewith, a substantially U-shaped member secured to said shaft and a tray adjustably secured to said U-shaped member for selectively supporting said butter stick.

HENRY E. YOUNG.
GEORGE V. FARNHAM.

REFERENCES CITED

The following references are of record in the file of this patent:

UNITED STATES PATENTS

| Number | Name | Date |
|---|---|---|
| 1,312,547 | Davgas et al. | Aug. 12, 1919 |
| 1,597,149 | Johnson et al. | Aug. 24, 1926 |
| 1,690,480 | Donnellan | Nov. 6, 1928 |
| 2,174,772 | Berg | Oct. 3, 1939 |
| 2,362,722 | Rush et al. | Nov. 14, 1944 |

FOREIGN PATENTS

| Number | Country | Date |
|---|---|---|
| 24,261 | Denmark | Mar. 12, 1919 |
| 719,728 | France | Nov. 23, 1931 |